March 6, 1962 R. RABIN ETAL 3,023,959

SYNCHRO TO DIGITAL CONVERTER

Filed May 4, 1960 8 Sheets-Sheet 1

INVENTORS
STANLEY OKEN
RICHARD RABIN
MARTIN J. SLAVIN
BY Borst & Borst
ATTORNEYS March 6, 1962 R. RABIN ETAL 3,023,959

SYNCHRO TO DIGITAL CONVERTER

Filed May 4, 1960 8 Sheets-Sheet 2

INVENTORS
STANLEY OKEN
RICHARD RABIN
MARTIN J. SLAVIN

BY Borst & Borst

ATTORNEYS

SYNCHRO TO DIGITAL CONVERTER

Filed May 4, 1960 8 Sheets-Sheet 3

SYNCHRO TO DIGITAL CONVERTER

Filed May 4, 1960

March 6, 1962 R. RABIN ETAL 3,023,959

SYNCHRO TO DIGITAL CONVERTER

Filed May 4, 1960 8 Sheets-Sheet 7

March 6, 1962 R. RABIN ET AL 3,023,959

SYNCHRO TO DIGITAL CONVERTER

Filed May 4, 1960 8 Sheets-Sheet 8

United States Patent Office 3,023,959

Patented Mar. 6, 1962

3,023,959

SYNCHRO TO DIGITAL CONVERTER

Richard Rabin, Stamford, Conn., and Stanley Oken, Plainview, and Martin J. Slavin, Bronx, N.Y., assignors to Sperry Rand Corporation, Ford Instrument Company Division, Wilmington, Del., a corporation of Delaware Filed May 4, 1960, Ser. No. 26,762
4 Claims. (Cl. 235—154)

This invention relates to computers and more particularly to computing systems which are capable of converting analog quantities to digital form.

In practice, it has been found that the analog to digital conversion equipment has had the complexity, weight and size which is comparable to the computers which are employed to process their digital output.

According to this invention, there is provided a completely electronic, solid state, synchro analog to digital converter which is physically compact and suitable for mobile employment. Further the conversion system is designed in such a manner that it can be adapted to perform analog to digital as well as digital to analog transformation and is capable of handling all types (sizes and frequencies) of analog synchros. The system is quite capable of being multiplexed so that numerous input channels can be sampled and the data converted by a single basic unit.

More particularly the converter uses synchro stator voltages as their analog input and employs the so-called "curve fit" conversion technique to digitize the ratio between two of the three phase stator voltages which are especially selected for the purpose of implementing that technique. The 360° of possible angular position of the synchro rotor is divided into 60° intervals and the digitized ratio is used to determine the specific position of the rotor within that interval. A unique phase detecting technique is utilized in order to determine in which of the 60° intervals the rotor is positioned. Although the system is basically described as a converter for a single speed synchro it should be, of course, recognized that the conversion technique is equally applicable to two speed or fine and coarse synchro input conversion and specific components are included to adapt the system for that purpose. Special features are provided to enhance the accuracy of the conversion by minimizing, for example, velocity error. The converter relies largely on gating expedients for making automatic selection of the three-phase input voltages for decoding purposes and there is provided an expedient for eliminating possible transient effects in the gates and associated amplifiers by the time that decoding has begun.

One object of the invention is to provide an easily multiplexible analog to digital converter which is relatively simple in circuit arrangement and which possesses no moving mechanical parts.

Another object of the invention is to provide a synchro to digital converter which is capable of performing analog conversion with improved accuracy, increased reliability and increased operating life.

A further object of the invention is to provide a synchro to digital converter which can be adapted to convert multispeed synchro systems by sequentially digitizing the high speed and low speed synchro stator voltages.

Figure 1:
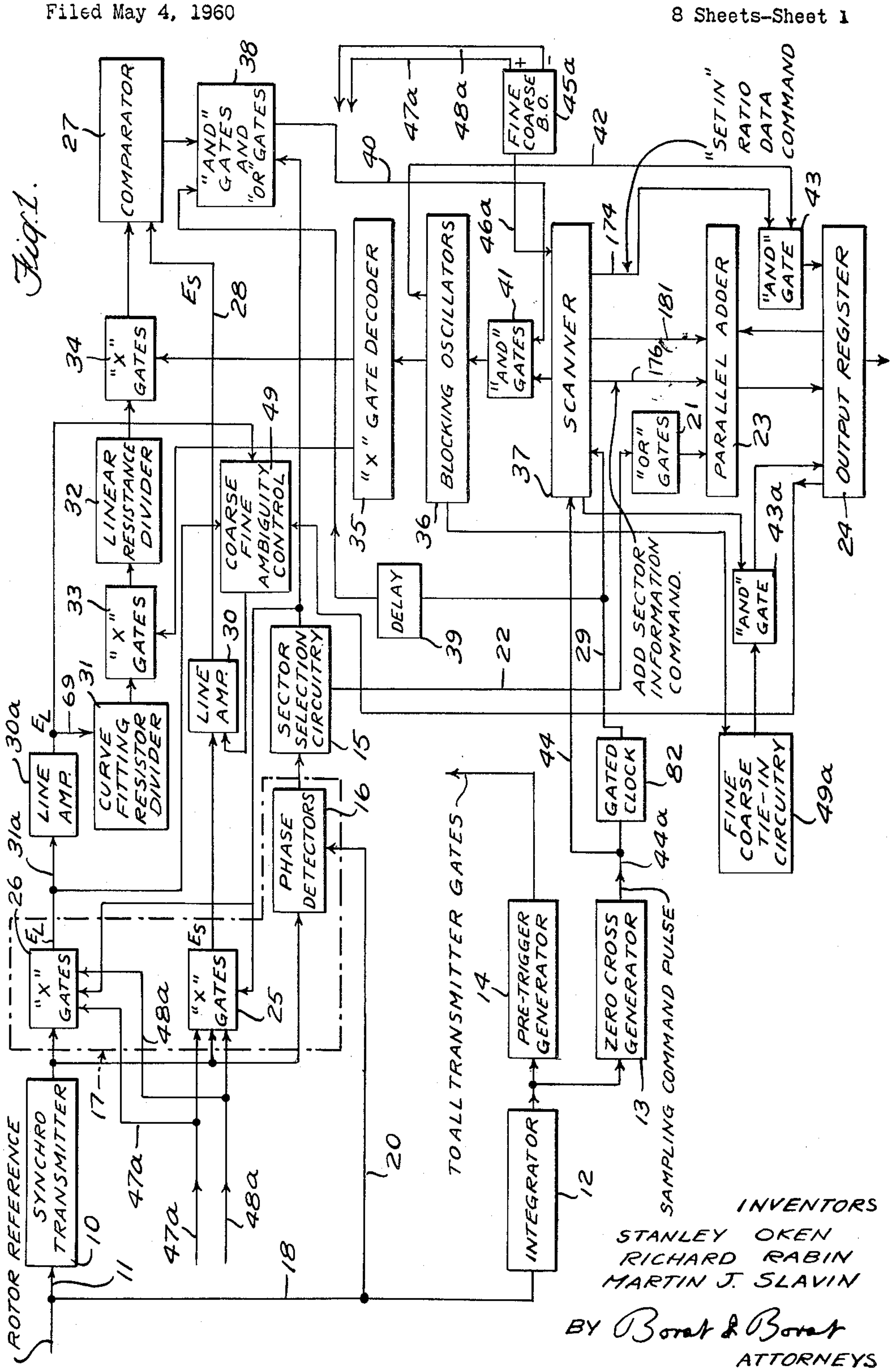
Figures 2, 3:
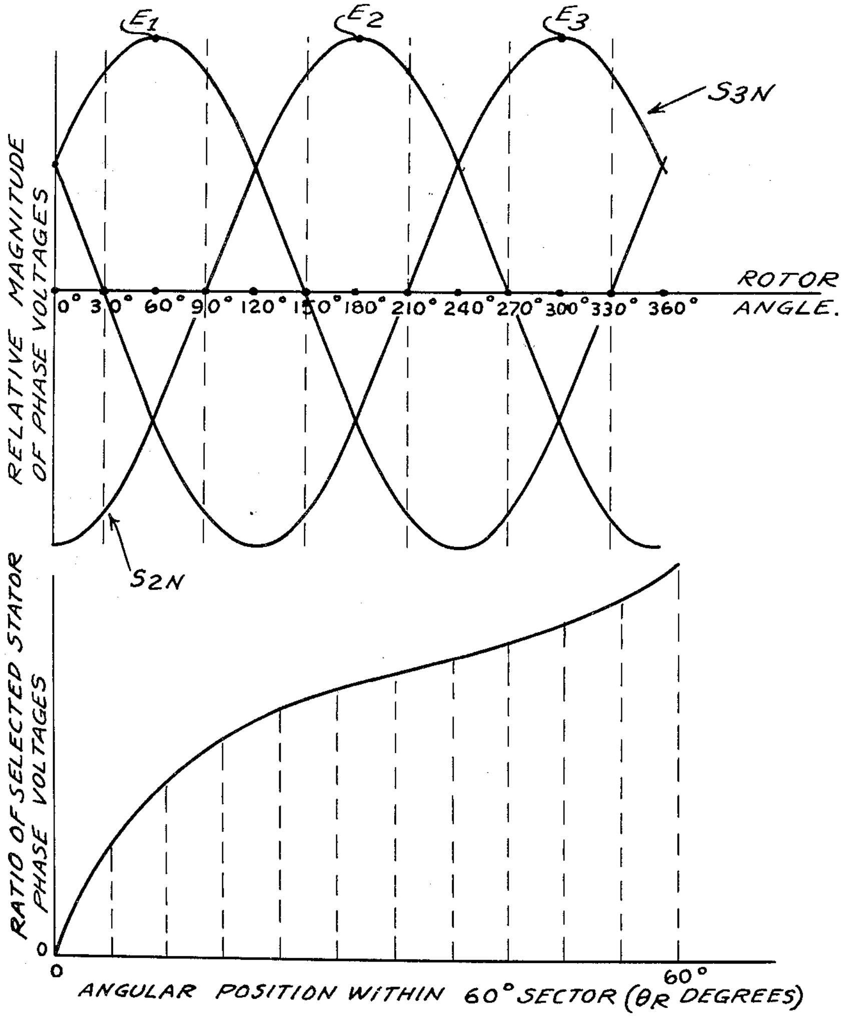
Figure 5:
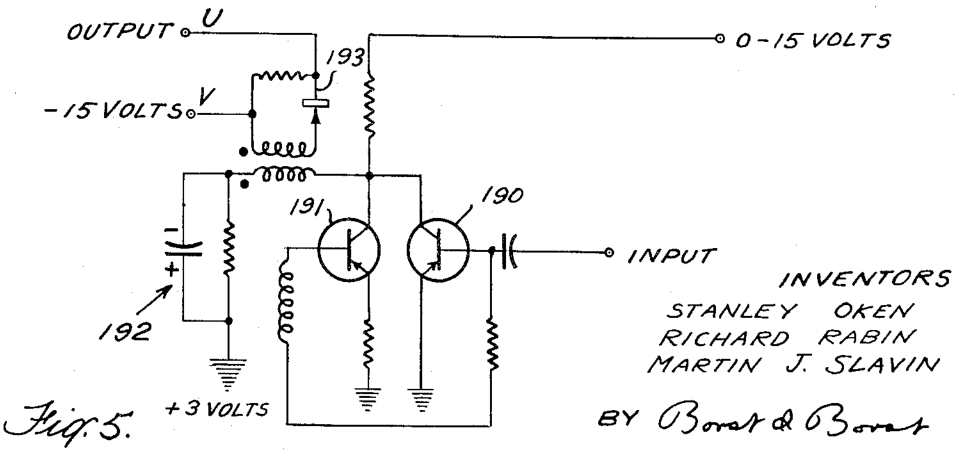
Figure 4:
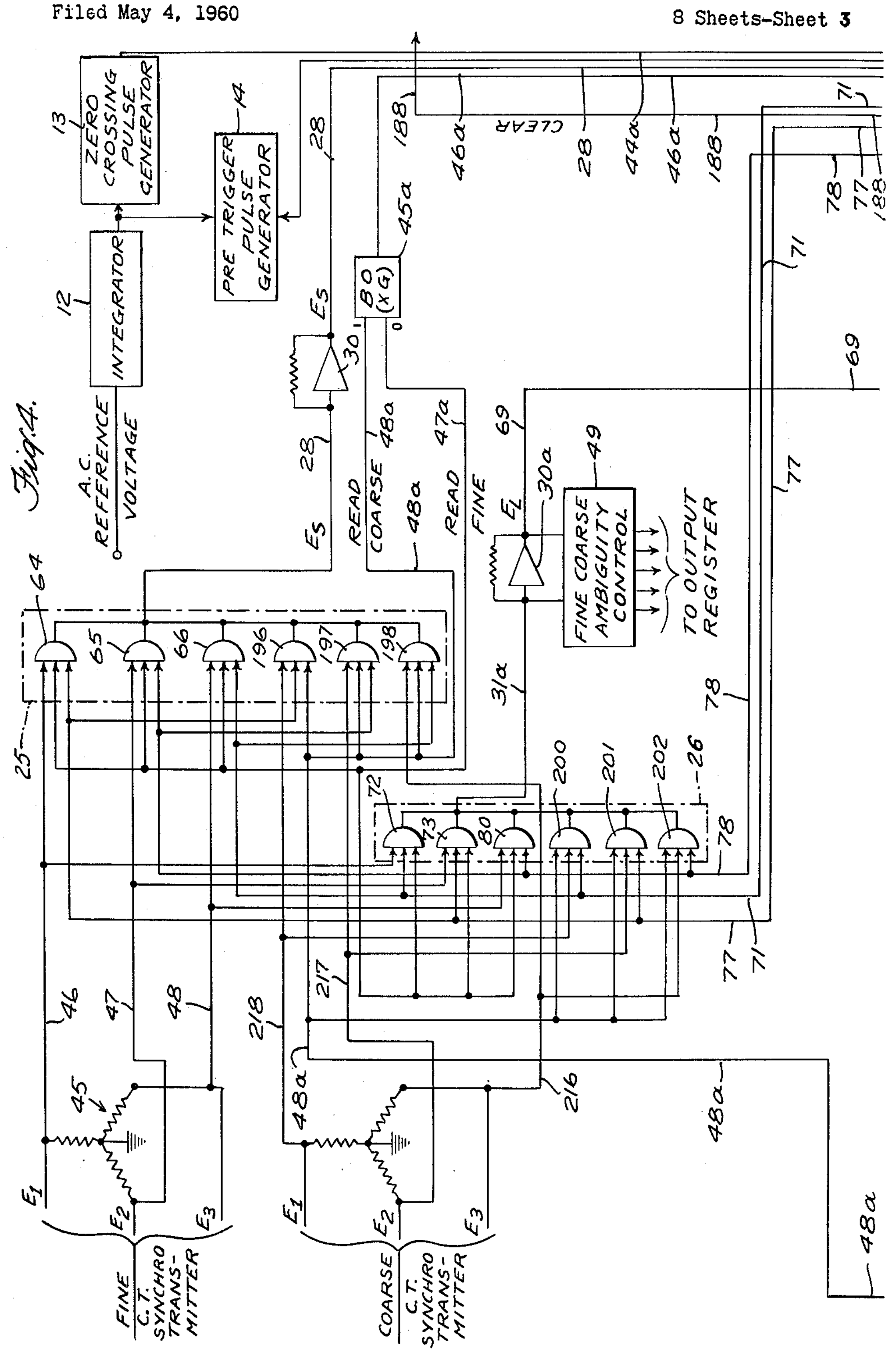
Figure 4A:
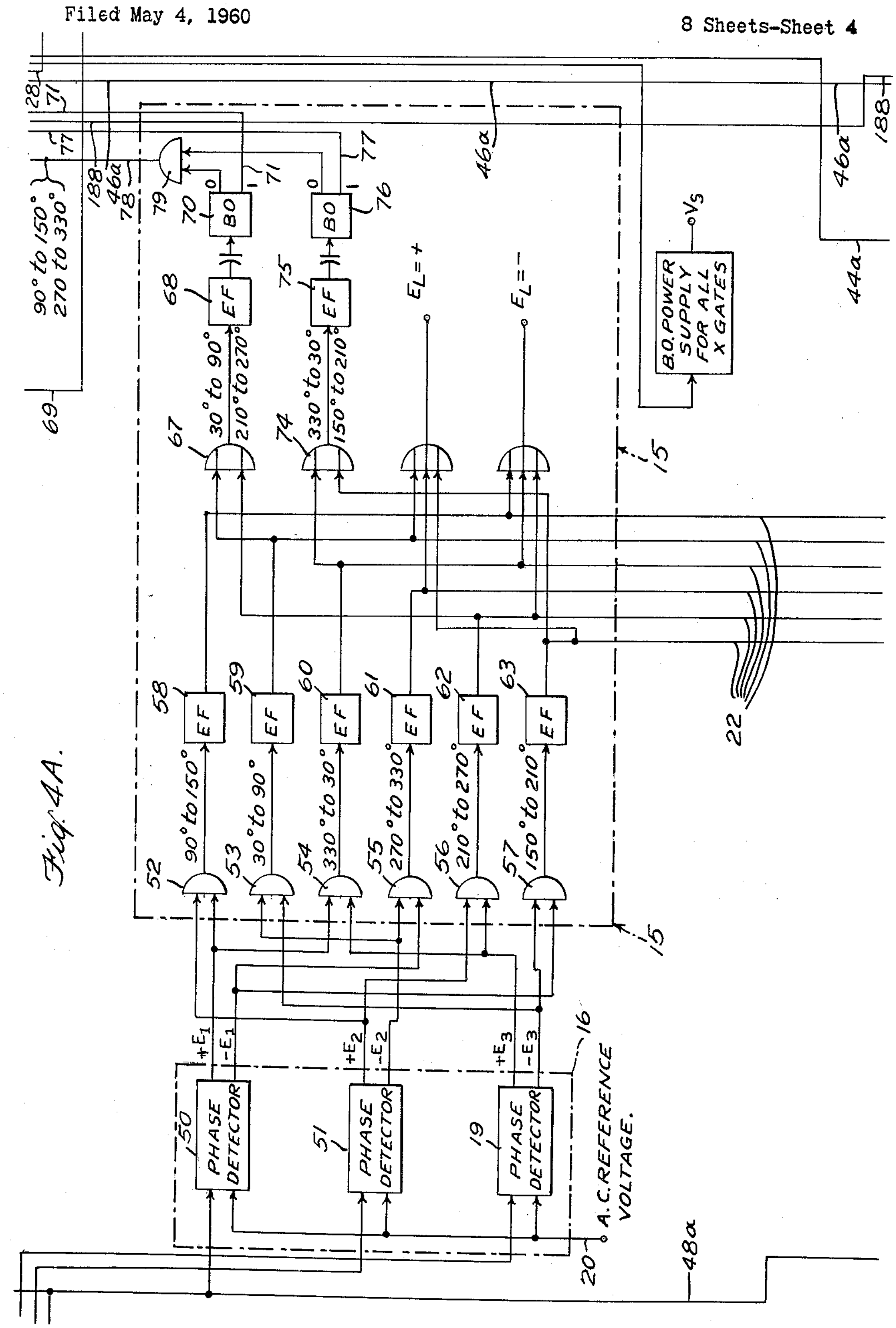
Figure 4B:
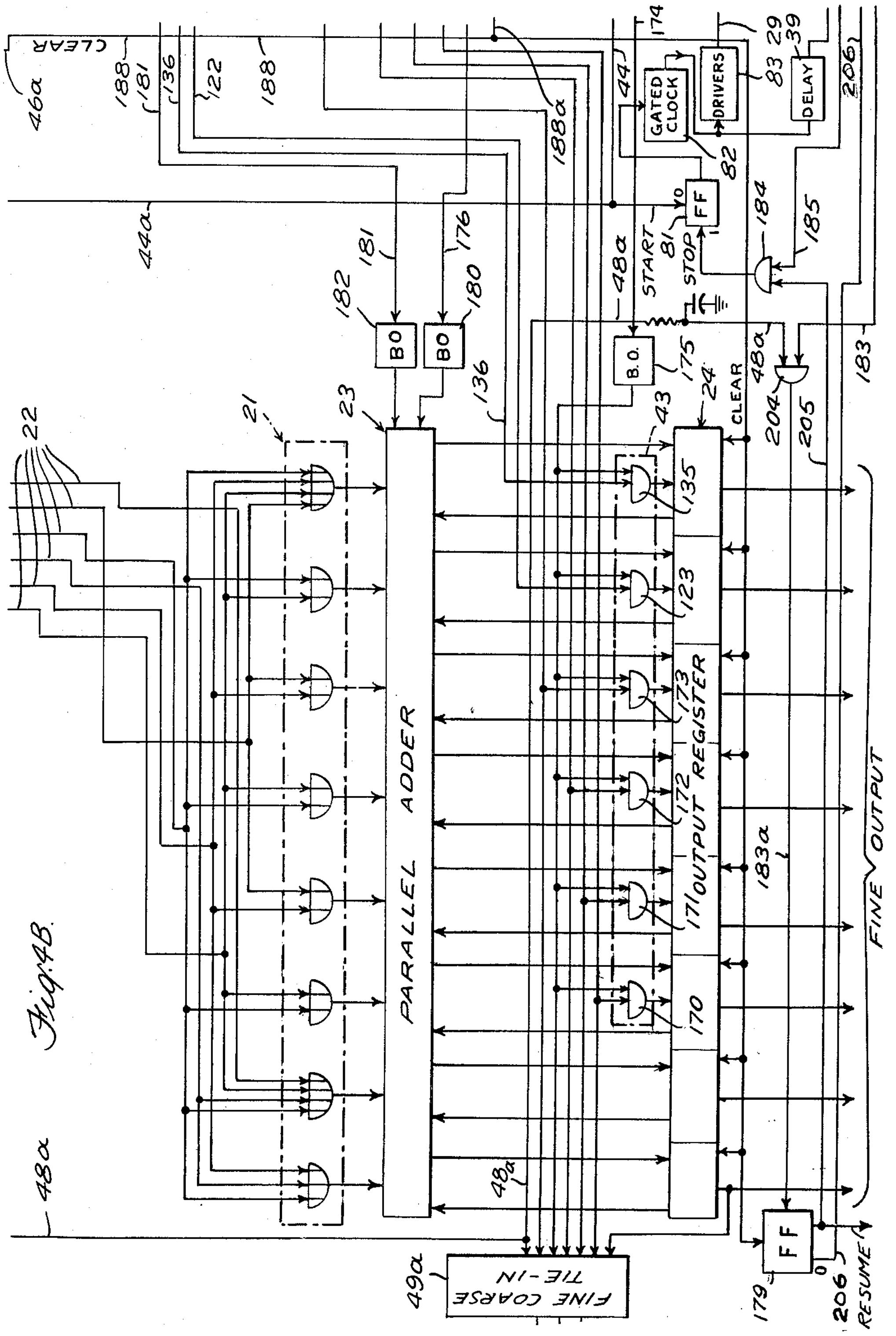
Figure 4C:
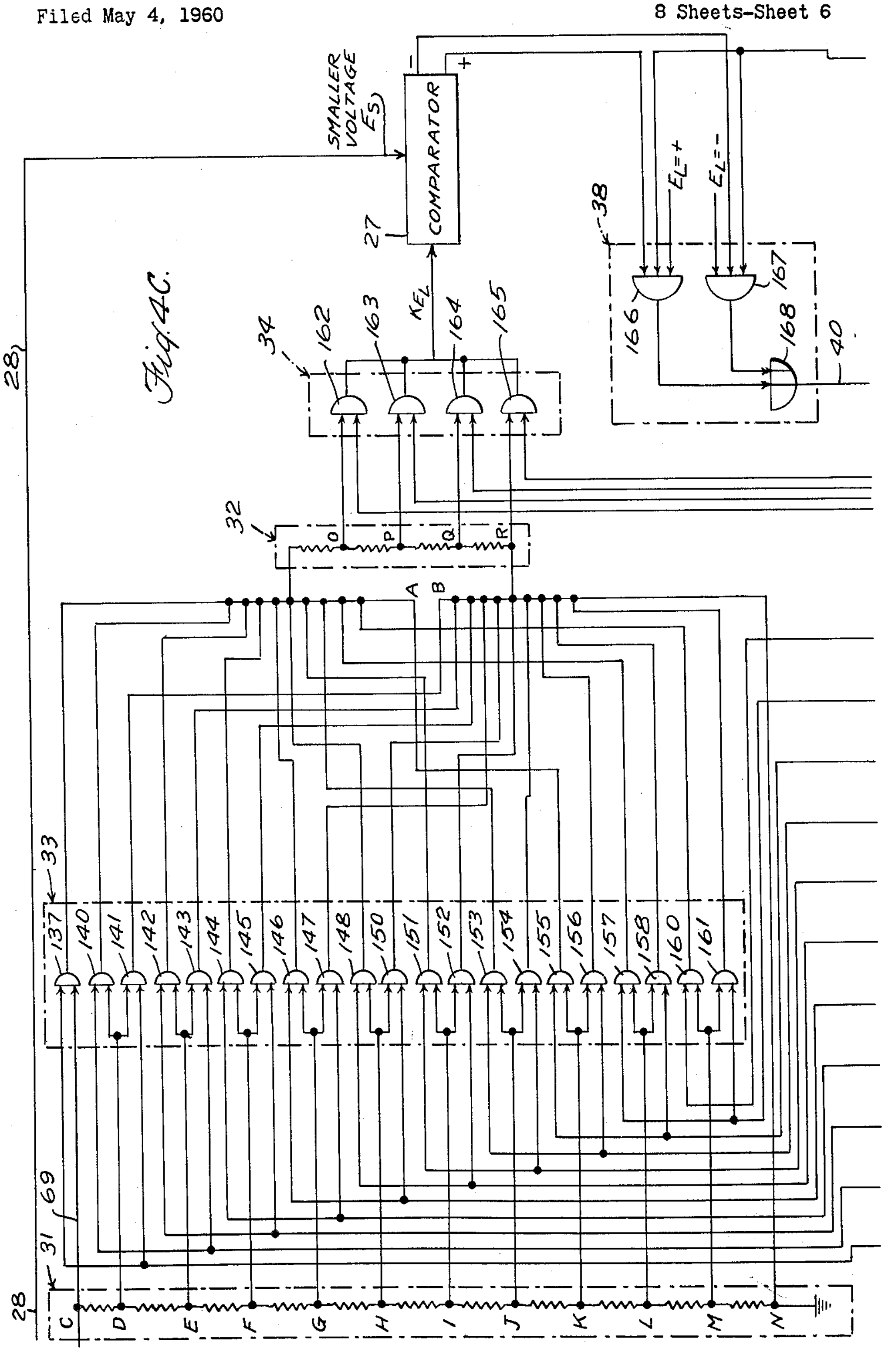
Figure 4D:
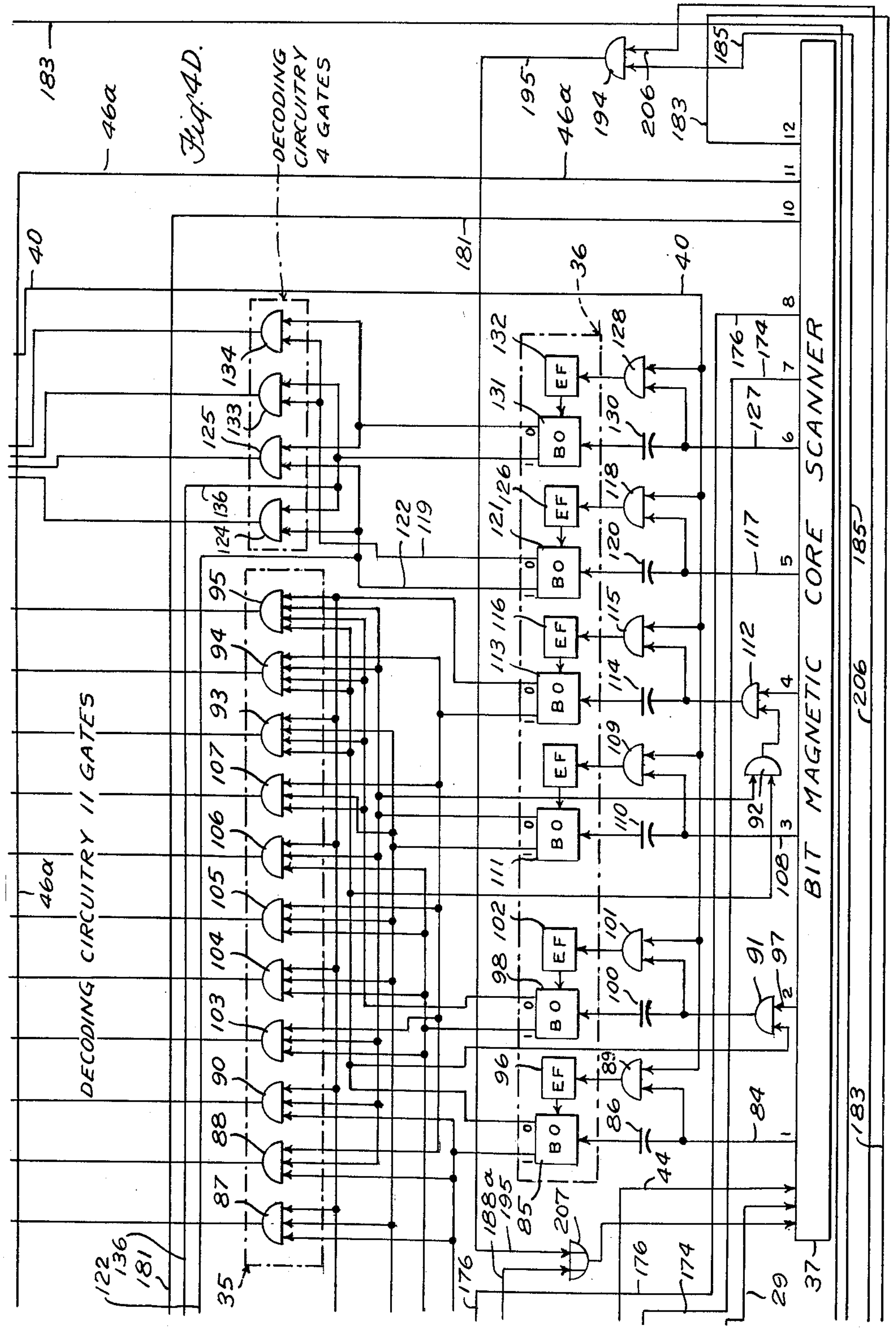
Figure 6:
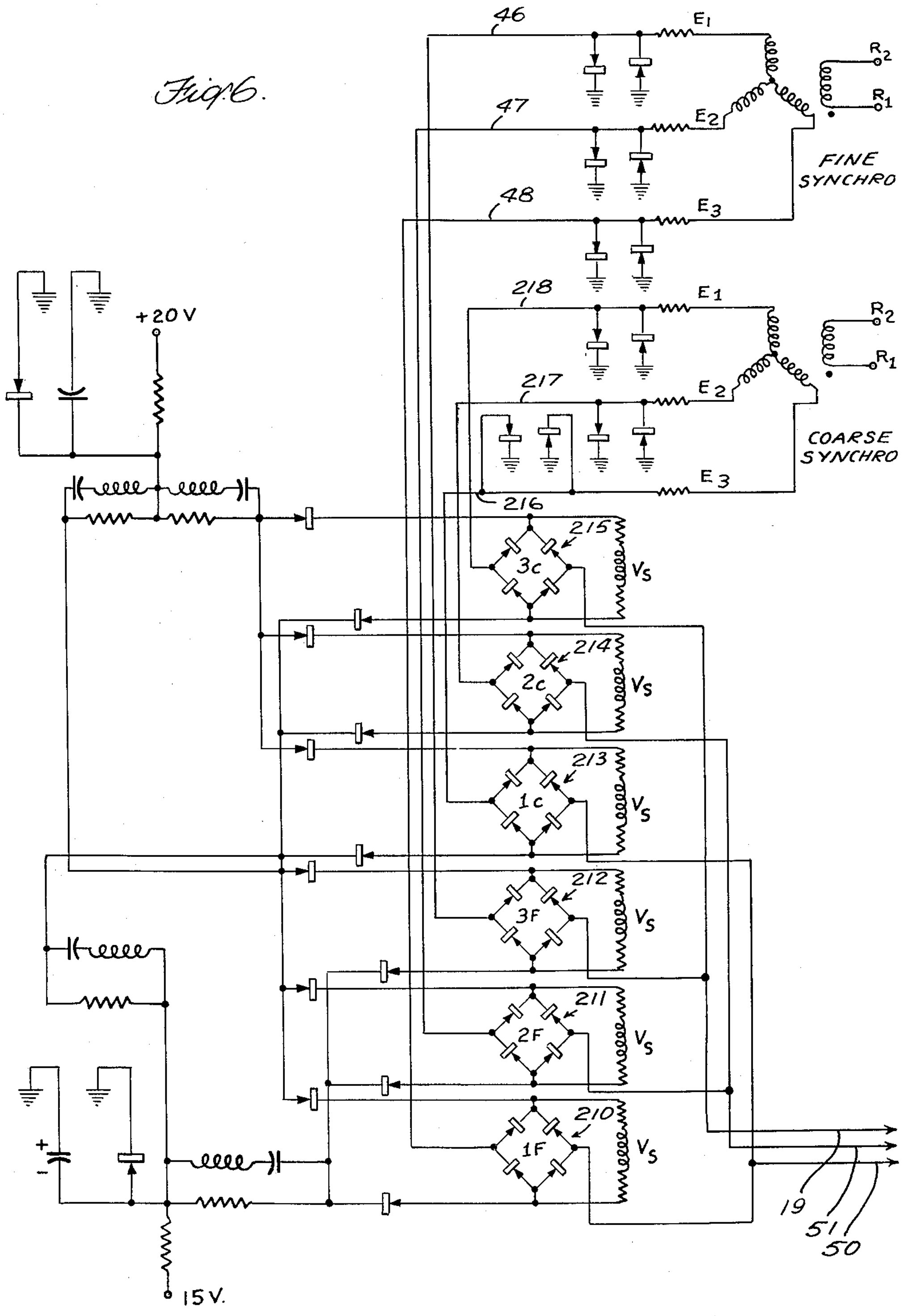

Other objects and advantages of the invention may be appreciated on reading the following detailed description of one embodiment, which is taken in conjunction with the accompanying drawings, in which FIG. 1 is a block diagram of the synchro to digital converter, FIG. 2 is a graph illustrating the three-stator phases of a synchro as a function of its rotor position, FIG. 3 is a graph illustrating the ratio of selected stator phase voltages as a function of rotor position in any 60° interval thereof, FIGS. 4, 4A, 4B, 4C and 4D disclose together a detailed schematic diagram of the synchro to digital converter, FIG. 5 is a schematic illustration of a blocking amplifier employed in the converter, and FIG. 6 shows input gating for two-speed synchro to digital system.

As shown in FIG. 1, there is provided a synchro transmitter 10 whose stator voltages are to be digitized by the converter. There is impressed on the synchro 10 a rotor A.C. reference voltage which is fed to it on line 11. This rotor reference voltage is, by means of line 18, also impressed on the integrator 12 which is employed to shift its phase position 90° so that the zero crossing of the shifted reference voltage will occur at the same time that the rotor reference voltage is maximum at which point it is desired that the digitizing of the analog inputs be effected. This is for the purpose of eliminating the "velocity error." This error is inherent in the synchro operation. It manifests itself as a difference in stator output voltages when the synchro is at a specified rotor position and when the rotor passes through the specified position while it is rapidly rotating. Since the error is due to a voltage component 90° out of phase with the synchro rotor reference 11, it is eliminated by digitizing the synchro output at a peak of the reference. At this instant the error component is zero. A zero cross generator 13 is employed to produce sampling pulses for this section synchronously with the selected timing of the maximum points of the rotor reference voltage applied to the synchro 10 or the time that the integrated reference voltage passes through zero. The pulsed high voltage power supply for the transmission gates employed in the converter is activated by a pre-trigger generator 14 which is employed to enable all the transmission gates in the converter preceding the zero cross pulse so that transient effects in the transmission gates and line amplifiers will have sufficiently decayed before the sampling command pulse is produced by the zero cross generator.

In the time interval between the activation of the pre-trigger generator and the production of the sampling pulse from the zero cross generator, the sector selection circuitry 15 of the converter is made operative. It is the function of this circuitry to determine in which of the six 60° intervals that the synchro stator is instantaneously positioned and further to select two of the three synchro stator voltages for subsequent processing in the curve fitting section of the converter which determines the rotor position within the selected 60° interval. To this end, phase detectors 16 are disposed in the fine-coarse channel 17 of the synchro 10 and are employed to determine the phase of each one of the three stator voltages relative to the rotor reference voltage conveyed to the phase detector by input lines 11, 18 and 20. In accordance with the related characteristics of synchro stator phase voltages in each of the several 60° intervals of rotor position, as will be explained, the determined 60° sector is conveyed to parallel adder 23 by "OR" gate 21 which is connected to the output of the sector selection circuitry by line 22. At the appropriate time, determined by "OR" gate 21, this circuitry data is added to the intrasector angle data in the parallel adder 23 which places the digital data in output register 24.

The sector selection circuitry also serves to enable selectively transmission "X" gates 25 and 26 disposed in the fine-coarse channel 17 of the synchro 10 so that the smaller voltage, $E_S$, in the selected 60° sector may be applied to line amplifier 30 and to comparator 27 on line 28 and the largest voltage, $E_L$, in the selected sector may be applied to the line amplifier 30*a* on line 31*a*. The logic which predicates this selection will be explained below. The voltage $E_L$ is applied by the line amplifier 30*a* to a curve fitting resistor divider 31 which, together with a linear resistor divider 32 determines the percentage of the voltage $E_L$ which will equal the voltage $E_S$ in the comparator 27. This percentage varies in a nonlinear manner as a function of angular position within each sector and, therefore, may be employed to determine the intrasector angle. It is explained below that this percentage is designated as a ratio K, for $E_S$ over $E_L$. Analog transmission "X" gates 33 and 34 are selectively enabled by "X" gate decoder 35 and blocking oscillators 36 which are sequentially operated by a scanner 37 to sample increments of the voltage $E_L$ until the ratio K is determined in the comparator 27. "AND" and "OR" gates 38 in the output of the comparator 27 control the polarity of the comparator output in response to sector information from the sector selection circuitry 15 and introduce on line 40 the comparator output, if any, to one of the "AND" gates 41 which is in control of the particular blocking oscillator which occasioned the comparator output. The binary state of the blocking oscillators register 36 is conveyed on line 42 to "AND" gate 43 enabled at the proper time by the scanner 37 through line 174 to set in this binary data to the output register, thence to the parallel adder 23, which, on command of the scanner, adds decoded representation of the intrasector angle to the sector angle and places the combined data in digital form in the output register 24 by means of lead 176. The sampling pulses generated by a gated clock 82 and placed in scanner 37 by line 29 control the sequential input to output pulsing of the scanner 37. Line 44 places the sampling command pulse, from the zero cross generator 13, in the scanner 37 and starts the scanner operation. A delay 39, connected between the gated clock 82 and the "AND" gates and "OR" gates 38, delays the clock pulses from reaching gates 38 until transient conditions from the comparator have sufficiently decayed.

In addition a fine-coarse blocking oscillator 45*a* connected by line 46*a* to the scanner 37 is provided to enable additional transmission gates in boxes 25 and 26 which are connected to receive coarse speed information so that the converter system may be arranged, if desired, to encode two speeds of synchro information. To this end the "one" output on blocking oscillator lead 47*a* is connected to the coarse transmission gates in boxes 25 and 26 and the "zero" output of the blocking oscillator 45*a* on lead 48*a* is connected to the fine group of transmission gates in boxes 25 and 26. It has been found in practice that operation of the two speed synchro to digital converter results in an ambiguity at the change point of the first speed to the second speed. Accordingly, there is provided a fine-coarse ambiguity control 49 connected to the output register 24 at the most significant bit thereof. The fine-coarse ambiguity control 49 is connected across line amplifier 30*a* in the $E_L$ voltage line and is connected to line amplifier 30 in the $E_S$ voltage line. Also it may be found desirable to change the bit code in the oscillators 36 for the course channel of the two-speed system and to prevent an ambiguous correlation between encoded fine and coarse shaft angles at 10° intervals of the coarse shaft angle, the fine-coarse tie in circuitry 49*a* connected to the output register 24 through "AND" gate 43*a*, being provided for this purpose. The primary function of the fine-coarse tie in circuitry is to monitor the fine information and control the coarse readout such that ambiguity is avoided.

In operation, synchro data is gated into the converter at pretrigger time. At zero cross time, the encoding of the ratio data is begun. The interval between pretrigger time and zero cross time is used to enable the sector selection gating and to allow transients to subside. The input gates 25 and 26 are used to perform the following operations:

Sequentially feeding fine and coarse synchro information to the phase detectors 16 to control the sector selection circuitry 15 and to connect the correct stator phases, as directed by the sector selection circuitry, directly to the comparator over line 28 and to the converter section on line 31*a*, the output of this section being also placed in the comparator 27. The sector selection circuitry is a logical system controlled by the state of the phase detectors 16. The sector selection circuitry 15 performs two functions, namely identifying the particular sector in which the synchro rotor is positioned and selecting the largest synchro phase voltage within the identified subject for application to the converter section and the smallest phase voltage for application directly to the comparator 27. The ratio between the largest phase voltage and the smallest phase voltage within an identified section is determined by performing successive divisions of the largest phase voltage in curve fitting resistor divider 31 and linear resistor divider 32. Successive sampling of the voltages in the dividers is performed by the "AND" gates 33 and 34 which are in turn controlled by the "AND" gate decoder 35. The decoder 35 is operated in accordance with the successive outputs of blocking oscillator 36 which are sequentially controlled by scanner 37 whose operation is initiated by the zero cross generator 13 and gated clock 82. In addition, the sequential operation of the blocking oscillators 36 is controlled by the output of the comparator 27 whereby the oscillators are permitted to be placed in "on" state solely on the condition that the comparator output is smaller than the smallest phase voltage placed therein on line 28. The comparator inputs must, therefore, have opposite polarity so that the polarity of the comparator output will be determinative of the larger of its two inputs compared therein. The state of the blocking oscillators determines the desired voltage ratio in accordance with the curve fitting technique and this ratio is placed in "AND" gate 43 and into the output register 24 and parallel adder 23 where it is added to the sector angle information derived from sector selection circuitry 15 and "OR" gate 21. The binary equipment of the sector and ratio angles are thus made to appear in the output register 24.

The converter system is shown in some detail in FIG. 4, FIG. 4A, FIG. 4B, FIG. 4C and FIG. 4D and will now be described with reference to those figures.

SECTOR SELECTION

The converter uses the synchro stator phase voltages obtained from the Y connected bank of resistors 45, which is in the synchro transmitter 10, in which the voltages $E_1$, $E_2$ and $E_3$ have been applied to stator leads 46, 47 and 48, respectively. The expressions for these voltages are $$E_1 = \sin\ (\phi_r + 30^\circ)\ \sin\ \omega t$$
$$E_2 = \sin\ (\phi_r + 150^\circ)\ \sin\ \omega t$$
$$E_3 = \sin\ (\phi_r + 270^\circ)\ \sin\ \omega t$$

where $\phi_r$ is the instantaneous angular position of the rotor. Reference to FIG. 2 indicates that there is an amplitude and polarity relationship existing among the three stator voltages of a synchro transmitter as a function of rotor position. It may be observed that in each 60° interval two-phase voltages are of the same polarity while a third is of opposite polarity. In the following table, there is given stator voltage polarity data for six 60° sectors of rotor angle.

*Table 1*

| Sector | Phase conditions specifying sector |
|---|---|
| 330° to 30° | $E_1=+$; $E_3=+$; $E_2=-$. |
| 30° to 90° | $E_3=-$; $E_2=-$; $E_1=+$. |
| 90° to 150° | $E_2=+$; $E_1=+$; $E_3=-$. |
| 150° to 210° | $E_1=-$; $E_3=-$; $E_2=+$. |
| 210° to 270° | $E_3=+$; $E_2=+$; $E_1=-$. |
| 270° to 330° | $E_2=-$; $E_1=-$; $E_3=+$. |

It will be noticed that in each sector, two of the stator voltages have the same polarity but that in no two of the 60° sectors do the same two phase voltages simultaneously have the same polarity. Voltages of the same phase may, therefore, be paired to identify each of the 60° sectors. To this end phase detectors 19, 51 and 50 are connected to the stator leads 46, 47 and 48, respectively, and are referenced by the A.C. rotor reference voltage. The phase detectors have two output leads and are adapted to place their respective stator voltages on one of their two output leads according to their phase relative to the reference voltage. "AND" gate 52 is connected to receive the positively phased stator voltage $E_2$ produced by phase detector 51 and the positively phased voltage $E_1$ generated by the phase detector 50. Reference to the table which is set forth above will readily enable one to appreciate that the gate 52 will produce an output when the rotor angle is in the 90° to 150° sector. Similarly, gate 53 is connected to the negative output leads of phase detectors 51 and 19 and will produce an output when the rotor is in the 30° to 90° sector since phase detector 51 and phase detector 19 are connected to the stator leads carrying the phase voltage $E_2$ and $E_3$. Gate 54 is connected to the positive output lead of the phase detector 50 and to the positive output lead of the phase detector 19 and will, therefore, produce an output when the sector is 330° to 30°. Gate 55 is connected to the negative output lead of phase detector 50 and the negative output lead 51 when the sector is 270° to 330°. Gate 56 is connected to the positive lead of phase detector 51 and the phase detector 19 and will, therefore, produce an output when the sector of the rotor is 210° to 270° while gate 57 being connected to the negative output lead of phase detector 50 and the negative output lead of phase detector 19 will yield an output when the rotor sector is 150° to 210°. Emitter followers 58 through 63 are connected to the output of the "AND" gates 52 and 57, respectively, and serve to place the appropriate sector data into "OR" gates 21 for the parallel adder 23. As will later appear, it is essential to select the largest and the smallest of the three stator voltages in order to determine the intra-sector angle. This selection is made by the sector selection circuitry in conjunction with transmission gates 64, 65 and 66 disposed in the stator leads 46, 47 and 48. The following table indicates which of the three stator voltages is the largest voltage $E_L$ and the smallest voltage $E_S$ in each of the six sectors.

*Table 2*

| Sector | Voltage applied to line amplifier—$E_L$ | Voltage applied to comparator—$E_S$ |
|---|---|---|
| 330° to 30° | $E_2=-$ | $E_1=+$. |
| 30° to 90° | $E_1=+$ | $E_3=-$. |
| 90° to 150° | $E_3=-$ | $E_2=+$. |
| 150° to 210° | $E_2=+$ | $E_1=-$. |
| 210° to 270° | $E_1=-$ | $E_3=+$. |
| 270° to 330° | $E_3=+$ | $E_2=-$. |

It will be noted that each stator voltage is largest in two of the 60° sectors and also each stator voltage is smallest in two of the 60° sectors. For example, the stator voltage $E_1$ is the largest of the three stator voltages and stator voltage $E_3$ is the smallest of the three stator voltages in the two sectors 30° to 90° and 210° to 270°. Accordingly, "AND" gates 53 and 56 are connected to the emitter followers 59 and 62 which are respectively in these two sector channels. The "OR" gate 67 feeds its output to the emitter follower 68. A blocking oscillator 70 which is connected to the emitter follower is placed into an "on" state by the output of the emitter follower 68. The "on" state output lead 71 of the blocking oscillator 70 is connected to transmission gate 72, which also has an input from the $E_1$ stator lead 46, and also to the transmission gate 66 disposed in the $E_3$ stator lead 48. A comparator which may be employed in the converter system is described in Millman and Taub, Pulse and Digital Circuits, McGraw-Hill 1956, chapter 15. Comparator 27 is connected to the transmission gate 66 through the line amplifier 30, which affords isolation and phase reversal, and is thus enabled to apply thereto the voltage $E_3$ as the smallest voltage $E_S$ in the sector as is proper for either one of the two sectors 30° to 90° and 210° to 270°. When the transmission gate 72 is enabled the stator voltage is placed into the curve fitting resistor divider 31 as the largest voltage $E_L$ in both these sectors by means of line 69. Similarly in sectors 330° to 30° and 150° to 210° the voltage $E_2$ is found to be the largest and the voltage $E_1$ is the smallest. Accordingly, "OR" gate 74 is connected to receive the outputs of emitter followers 60 and 63 disposed in the channels of these sectors and by means of emitter follower 75 is able to turn on blocking oscillator 76 when the rotor is determined to be in one of these sectors. The lead 77 connects the blocking oscillator 76 to transmission gate 73, which is also tapped to the $E_2$ stator line 47, and to the gate 64 disposed in the $E_1$ stator phase line 46. The gate 64 is thus enabled to apply the voltage $E_1$ to the comparator 27 as the smallest voltage $E_S$ and transmission gate 73 is able to place the stator voltage $E_2$ on line amplifier 30*a* as the largest voltage $E_L$. When neither the blocking oscillators 70 nor 76 have been turned on the rotor angle must fall within one of the two remaining sectors 90° to 150° and 270° to 330°. Accordingly, "AND" gate 79 is connected to the "zero" output leads of the blocking oscillators 70 and 76 and this gate is connected by lead 78 to transmission gate 80, which is also tapped to the $E_3$ stator lead 48, and also to the gate 65 disposed in the $E_2$ stator lead 47. Accordingly, the gate 65 is enabled to apply the voltage $E_2$ as smallest voltage $E_S$ to the comparator 27 and the gate 80 is enabled to apply the voltage $E_3$ as the largest voltage $E_L$ to the line amplifier 30 which is proper for both sectors.

The sector selection circuitry 15 yields sector information to the "AND" gates and "OR" gates 38, so that the comparator is able to apply an output of a given polarity to the blocking oscillators of the ratio determining section of the converter regardless of the polarities of the input quantities.

RATIO DETERMINING SECTION

It is the function of the ratio determining section of the converter to determine the intrasector angle of the rotor and apply this information in digital form to the output registers. The ratio determining section employs the so-called curve fitting technique which eliminates the need for a transformation table. The curve is a function of the ratio K, which is $$\frac{E_S}{E_L}$$

to rotor angle $\phi_r$ and is shown in FIG. 3. It will be noted that the value of K varies non-linearly from zero at the beginning of each 60° sector to −1 at the end of the sector. Since the relation of K to rotor angle is the same in each 60° sector a determination of K will yield the intrasector angle of any sector in which the rotor is positioned. Using the curve fit conversion technique, the ratio K is obtained by finding the value of K which satisfies the equation $KE_L=E_S$. The nonlinear resistor divider 31 is connected to receive at one end the voltage $E_L$ and is adapted to drop the voltage $E_L$ nonlinearly, being divided therefor into eleven segments corresponding to the eleven 5.64° segments as is the ratio determining curve in FIG. 3. The value of K at the tapping point of the intersection between each resistor pair in the divider 31 has an exact correspondence with the theoretical value of K at each 5.64° increment of rotor position shown in the graph in FIG. 3. The value K is determined by the comparator which compares the smaller voltage $E_S$ with the output of the nonlinear divider 31 and linear divider 32. Various percentages of the large voltage $E_L$ are consecutively sampled and introduced into the comparator 27 until the percentage of the larger voltage $E_L$ which is equal to the smaller voltage $E_S$ has been found. This sampling of the two resistance dividers is initiated by the scanner 37 which sequentially activates blocking oscillators 36 so as to enable transmission gates 33 and 34 tapped into the nonlinear resistance divider 31 and linear resistance divider 32, respectively. To this end a starting pulse is placed into the scanner 37 and a flip-flop device 81 which operates a gated clock 82 to activate drivers 83 for the scanner. The scanner is in effect a magnetic core shift register of the one core per bit type. A "one" inserted into the read winding of the first core will generate a pulse on its output line, when a voltage pulse is impressed across the shift winding. At the same time the "one" will be transferred to the second core. Upon receipt of the next "shift" pulse, an output will appear on line 2, and the "one" will be transferred to core 3. Output pulses appear on each scanner output line in succession until the "one" is shifted out of the last core. At this time the "one" may be recirculated back to the first core thus repeating the sequence, or the "one" may be prevented from returning to the first core by means of logical gating, but will be used instead to stop the clock. Two complete circulations are required for the processing of two-speed synchro information, whereas a single circulation would be used to process one-speed information.

The entire sequence of events necessary for the sampling, encoding and presentation of information is performed in synchronism with the sequential generation of output Clock scanners of the type generally available are described in Millman and Taub, Pulse and Digital Circuits, McGraw-Hill, 1956, pages 425–426. Output line 84 of the scanner 37 is connected to a blocking oscillator 85 through a pulse differentiating capacitor 86 and also to "AND" gate 89. The "on" output lead of the blocking oscillator 85 is connected to three "AND" gates 87, 88 and 90, whereas the off output lead of the blocking oscillator 85 is connected to the "AND" gate 91, the "AND" gate 92 and each of the "AND" gates 93, 94 and 95. The "AND" and "OR" gates 38 are also connected to the "AND" gate 89 which serves as a turn off control of the blocking oscillator 85 through emitter follower 96. Output lead line 97, from the scanner, serves as a second input to the "AND" gate 91 the output of which is placed into blocking oscillator 98 through pulse differentiating capacitor 100 and to "AND" gate 101. The output lead 40, from "AND" or "OR" gates 38, is connected as a secondary input to the "AND" gate 101 which in conjunction with emitter follower 102 serves as a turn off control for the blocking oscillator 98. The blocking oscillator 98 has an "on" output lead connected to the "AND" gates 103, 104, 105 and 106 while the off output lead of the blocking oscillator 98 is connected to "AND" gates 107, 93, 94 and 95. The third output lead 108 of the scanner is connected through pulse differentiating capacitor 110 to blocking oscillator 111 and to "AND" gate 109 the "on" output lead of which is connected to the "AND" gates 104, 105, 107 and 93 whereas its off output lead is connected to the "AND" gate 88, "AND" gate 90, "AND" gate 103, "AND" gate 106, "AND" gate 92, "AND" gate 94 and "AND" gate 95. "AND" gate 112 is connected to the fourth output lead of the scanner and to the output side of the "AND" gate 92, blocking oscillator 113 is in triggering connection with the "AND" gate 112, the connection having a pulse differentiating capacitor 114 and a tapping connection to "AND" gate 115. The output lead 40 serves as the second input lead to the "AND" gate 115 which in turn serves as a turn off control for the blocking oscillator 113 in conjunction with the emitter follower 116. The "on" lead of the blocking oscillator 113 is connected to the "AND" gate 88, the "AND" gate 103, the "AND" gate 105, the "AND" gate 107, and the "AND" gate 94. While the off output lead connection of the blocking oscillator 113 is connected to the "AND" gates 87, "AND" gates 90, "AND" gates 104, "AND" gates 106, "AND" gates 93 and "AND" gates 95, output lead 117 is connected to "AND" gate 118 and through pulse differentiating capacitor 120 to blocking oscillator 121. The "on" output lead 122 of the blocking oscillator 121 constitutes one input to "AND" gate 123 in the "AND" gate section 43 for the parallel adder 23 and an input to logical "AND" gates 124 and 125 while the "off" output lead 119 is connected to "AND" gates 133 and 134 which are part of the decoding circuitry for the linear resistor divider 32. Output lead 40 is connected as a second input to gate 118 which serves with emitter follower 126 as a change of state control for the blocking oscillator 121 to drive it back to its original state after it has been triggered. Output lead 127 of the scanner is connected to "AND" gate 128 and through pulse differentiating capacitor 130 to the blocking oscillator 131. The "AND" gate 128 is also connected to the output lead 40 and together with emitter follower 132 serves as a change of state control for the blocking oscillator 131. The "on" output lead of the blocking oscillator 131 is connected to "AND" gate 135 in the output register "AND" gate section 43 by means of lead 136 and to the logical "AND" gates 124 and 133 while the "off" output lead of the blocking oscillator 131 is connected at a second input to the logical "AND" gates 125 and 134.

Transmission gate 137 in the gate section 33 for the curve fitting resistor divider 31 receives the larger voltage $E_L$ from the line amplifier 30*a* and also the output of the logical "AND" gate 87 in the blocking oscillator decoding gate section 35. The remaining taps on the resistor divider 31 are each connected to two "AND" gates in the gate section 33. Also each of the decoding gates in gate section 35 furnish inputs to two of the "AND" gates in gate section 33. Accordingly, transmission gate 140 in gate section 33 is connected to decoding gate 88 and to tap point D in the resistor divider 31 while transmission gate 141 is also connected to tap point D and to the decoding gate 87. Similarly, transmission gate 142 and transmission gate 143 are connected to tap point E in resistor divider 31 whereas transmission gate 142 is controlled by the decoding gate 90. Transmission gates 144 and 145 are connected to the decoding gates 103 and 90, respectively, and are connected to the tap point F in the resistor divider 31. Transmission gates 146 and 147 are connected to the decoding gates 104 and 103, respectively, and are connected to the tap point G of the resistor divider 31. The logical transmission gates 148 and 150 are connected to the decoding gates 105 and 104, respectively, and to tap point H of the resistor divider 31. The transmission gate 151 and the gate 152 are each connected to the tap point I of the resistor divider 31 and respectively to the decoding gates 106 and 105. The transmission gates 153 and 154 are connected to the tap point J of the resistor divider 31 and respectively to the decoding gates 107 and 106. The transmission gates 155 and 156 are enabled by the decoding gates 93 and 107, respectively, and the voltage at tap point K of the resistor divider 31. The transmission gates 157 and 158 are joined to the tap point L of the resistor divider 31 and to the logical "AND" gates 94 and 93 of the decoding section 35 of the blocking oscillator. Transmission gates 160 and 161 are in enabling connection with the "AND" gates 95 and 94, respectively, and the tap point M of the resistor divider 31.

Point C which is at the full voltage end of the curve fitting resistor divider 31 is connected through the gate 137 to point N which is at the grounded side of the curve fitting resistor divider 31 and is joined to point B. The linear resistor divider 32 is connected to the points A and B. The point A also receives the output of half the gates in gate section 33 and the point B receives the remaining half of the transmission gates in this gate section.

The linear resistor divider 32 has gate tap points O, P, Q and R being connected respectively to transmission gate 162, transmission gate 163, transmission gate 164, transmission gate 165 of the gate section 34. The transmission gate 162 is also connected to the output of the decoding gate 124; the transmission gate 163 is connected to receive the output of the decoding gate 125; the transmission gate 164 is connected to the output of the decoding gate 133 and the transmission gate 165 is connected to the output side of the decoding gate 134. Comparator 27 receives the output of the transmission gates in the gate section 34 which is enabled by blocking oscillators 121 and 131.

In operation, the ratio determining section of the converter employs the half split method for fitting the output of the two resistor dividers to the curve which expresses the ratio $$\frac{E_S}{E_L}$$

as a function of rotor position. The binary state of the blocking oscillators 36 constitutes the digital expression of the intrasector angle. Each blocking oscillator is turned on in sequence by the scanner and either remains on or is immediately turned off by the comparator 27 in the event that the output of the gated resistor dividers is larger than the smaller voltage $E_S$ selected for the particular sector by the sector selection circuitry 15. For example, when blocking oscillator 85 is turned on it may be seen that the decoding gate 90 is enabled which in turn enables transmission gates 142 and 145 at taps E and F of the resistor divider 31. The output of gate 142 is placed at point A while the output of gate 145 is placed at point B. It may also be seen that the decoding gate 134 will apply a voltage to transmission gate 165 so that the voltage $KE_L$ applied to point B may be placed in the comparator 27 and there differentially compared with the voltage $E_S$. Assuming that $KE_L$ is larger than $E_S$ then an output will be produced in one of the "AND" gates 166 or 167, in the output of the comparator, and is placed on line 40 through the "OR" gate 168. Since the scanner is also applying the voltage to the "AND" gate 89 this gate on receiving the comparator output will immediately place the blocking oscillator 85 in its "off" state. The second pulse output of the scanner is received by the gate 91 which is thus enabled by the scanner pulse and the "off" state output of the blocking oscillator 85 to turn on the blocking oscillator 93 which enables the decoding gate 106 which in turn enables the transmission gates 151 and 154 to place the voltages at points I and J, of the resistor divider 31, on points A and B, respectively, of the resistor divider 32. Now if $KE_L$ is smaller than $E_S$ blocking oscillator 111 is next placed into its "on" state. The next scanner pulse will turn on the blocking oscillator 98 which through decoding gate 104 "enables" the transmission gates 146 and 150. The voltages at points H and I are connected to points A and B. The voltage at B is transmitted through transmission gate 165 and placed in the comparator as voltage $KE_L$ and compared with the voltage $E_S$. Assuming that the voltage $KE_L$ is larger than $E_S$ the blocking oscillator 111 is immediately turned off and blocking oscillator 113 is turned on by the scanner and the "AND" gates 92 and 112, placing the blocking oscillator 113 in its "on" state, "enables" the "AND" gate 105 which in turn "enables" transmission gates 148 and 152. The voltage at point I is transmitted to point B and transmitted to the comparator 27 by transmission gate 165 and is compared with voltage $E_S$ in the comparator 27. Assuming that the voltage $KE_L$ is now less than the voltage $E_S$ no output is generated by the comparator and the blocking oscillator 113 and remains in its "on" state.

Varying clock pulses activate the scanner lines 117 and 127 sequentially to enable the decoding gate 125 and either decoding gate 124 and 133 depending upon the state of the blocking oscillator 121 after it has been activated. Linear interpolation by the transmission gates in gate section 34 of the linear resistor divider 32 is thus effected. After the blocking oscillator 131 has been activated by the scanner, the state of the six blocking oscillators will then digitally represent the decoded ratio K which is determinative of the intrasector angle. Logical "AND" gates 170, 171, 172, 173, as well as the "AND" gates 123 and 135 in output register gate section 43, receive the digital output from the blocking oscillator register 36 when a scanner pulse is applied to line 174 which activates the blocking oscillator 175 causing the parallel adder gates to insert a digitizing quantity into the output register 24. The parallel adder 23 receives these quantities from the register and partially adds the intrasector data to sector data inserted by the "OR" gate section 21 when the scanner places a pulse on line 176 which is connected to the parallel adder 23 through blocking oscillator 180. The following scanner pulse on line 181 causes a pulse to actuate the blocking oscillator 182 causing the digitizing process to be completed. The total decoded quantity is placed in the output register. Where the system is a two-speed system and employs a coarse output register as well as a fine output register the next scanner pulse on line *46a* serves to shift the state of the blocking oscillator *45a*. The zero state output of this oscillator on lead *47a* "enables" the transmission gates 64, 65 and 66, the selected output of which is the voltage $E_S$ and the transmission gates 72, 73 and 80 the selected output of which is the voltage $E_L$. The one state output of the blocking oscillator *45a* on lead *48a* "enables" transmission gates 196, 197 and 198 for the voltage $E_S$ and transmission gates 200, 201 and 202 which are selective of the voltage $E_L$. A scanner pulse on line 183 is then placed as one input into "AND" gate 204, the other input for which is received on output line *48a* of the blocking oscillator *45a*. The output of the "AND" gate 204 is then placed into the flip-flop 179 on lead *183a* causing the flip-flop to shift to the "one" state, the output of the flip-flop in the "one" state being placed on line 205 into a logical "AND" gate 184. The last scanner pulse on lead 185 is introduced to the "AND" gate 184 as the second input which shifts the state of the flip-flop 81 to cause the gated clock 82 to stop. A pulse on the clear line 188 then causes the flip-flop 179 to shift to the zero state, the corresponding output signal voltage for which is placed on line 206 serving as the "one" state input to the "AND" gate 194. The second input for the gate 194 is the last scanner pulse on lead 185 which, when conveying an off-pulse signal, "enables" the "AND" gate 194 causing the latter to return a pulse to the input of the first stage of the scanner through logical "OR" gate 207. The other input for the latter gate is the clear signal carried on lead *188a* which is connected to the clear signal input lead 188. A pulse on the clear line 188 then permits the register 24 to clear causing the flip-flop 179 to change its state.

As shown in the detailed schematic drawings and as indicated in FIG. 1 sector information is placed in the "AND" gates and "OR" gates contained in box 38. The functioning of these gates will require additional clarification. As explained above, the comparator operates by detecting and amplifying the difference between the reference signal $E_S$ and a quantitized signal $KE_L$. Both signals are always of opposite polarity although either polarity may apply to each dependent on the synchro rotor angle. An output pulse is generated by the comparator whenever the quantitized signal exceeds the reference signal in magnitude. Two pulse polarities can result from this depending upon whether the reference signals are positive or negative. Since the "AND" gates 41 respond to only one signal, it is necessary to introduce an inversion of polarity when required. Once the sector angle is determined so that the polarity of the voltage $E_L$ is known, "AND" gate 166 or "AND" gate 167 is "enabled." If the "AND" gates associated with the blocking oscillator register respond solely to a positive pulse, the "AND" gate 167, which is enabled when $E_L$ is negative, would include an inverter so that the output of the "OR" gate 168 on line 40 would be positive regardless of the polarity of the comparator output.

Referring to FIG. 5 the blocking oscillator employed in the converter includes a pair of transistors 190 and 191 connected across an RC network 192. The blocking oscillator used for digital logic is triggered by means of a pulse on an electrode of the transistor 190 and the output is placed on a rectified lead 193 which is coupled to the oscillator at a point between the transistors and the RC network. After the oscillator returns to its normal state, its output on terminal U is supplied by a negative 15 volt source applied to terminal V.

Where a two-speed synchro to digital converting system is employed it will be necessary to successively place coarse and fine synchro information in the phase detectors 50, 51 and 19 of the sector selection circuitry. To this end there may be provided transmission gates 210, 211, 212, 213, 214, 215. (See FIG. 6.) The fine information gates 210, 211, 212 being connected to the synchro transmission leads 48, 47, 46, respectively, while transmission gates 213, 214, 215 are connected to the synchro transmission leads 216, 217, 218, respectively. In general the transmission gates consist of a full wave type diode rectifier with a control bias coil $V_S$ connected across the full wave rectifier which is further biased on its positive side by a −15 volts source and on its negative side by a +20 volts source. When the control bias signal is placed on the control bias coil $V_S$, the steady negative and positive biases on the full wave rectifier are overcome so that the particular transmission gate will be "enabled" to conduct the signal phase of the coarse or fine synchro information which is carried on the synchro transmitter lead to which it is connected. The phase detector connected to the output of that transmission gate would then receive that signal phase of the coarse or fine synchro input.

As explained above, fine-coarse ambiguity control 49 is provided so that the system may be adapted to a two-speed system. This control is controlled by the content of the output register 24. If a "one" exists in the most significant bit of this register, a control voltage will be generated to enable transmission gates which will provide an effective shift of approximately −2° in the analog voltages transmitted from the second synchro in the two-speed system. The −2° shift is applied when the most significant bit is present, that is when the synchro angle of the first synchro in the two-speed system falls between 180° and 360°. When the most significant bit in the output register 24 is zero, there is a positive shift in the synchro voltages applied to the comparator 27 and resistor divider network 31. Additionally, for the two-speed synchro, if desired, the output register for the second speed system may be read out in a three-bit code instead of a six-bit code provided by the scanner controlled blocking oscillators read by the output register 24. Fine-coarse tie in circuitry *49a* is provided to make this conversion where two-speed operation is in effect both the coarse and fine sections of the output register 24 are being used. First, the fine or high speed synchro stator voltages energize the conversion equipment, sector and ratio information is determined and their combined total is inserted into the fine data section of the output register. The fine synchro transmission gates are then disabled and the coarse or low speed synchro stator leads energize the conversion equipment via the transmission gates. The coarse sector and ratio data are then summed and inserted in the coarse data section of the output register.

Various modifications of the converter may be effected by persons skilled in the art with out necessarily departing from the principle and scope of invention as defined in the appended claims.

What is claimed is:

1. A synchro-digital converter comprising a synchro transmitter, transmission gates disposed in the stator leads of said transmitter, a phase detector disposed in each of said stator leads, sector selection circuitry in the output of said phase detectors and placed in enabling control of said transmission gates, means connected to the output of said transmission gates for determining the ratio between stator voltages selected by said sector selection circuitry, digitizing means connected to receive the output of said sector selection circuitry and said ratio determining means.

2. A synchro-digital converter comprising a synchro transmitter, input transmission gates disposed in the stator leads of said transmitter, a phase detector disposed in each of said stator leads, sector selection circuitry in the output of said phase detectors and placed in enabling control of said input transmission gates, means connected to the output of said input transmission gates for determining the ratio between stator voltages selected by said sector selection circuitry, said ratio determining means comprising two parallel channels, with said input transmission gates disposed in the input sides of said channels and a comparator disposed in the output side thereof, one of said channels comprising in series combination a line amplifier, a curve fitting resistor divider, a second set of transmission gates, a linear resistor divider and a third set of transmission gates, the other of said channels comprising a direct connection between said input transmission gates and said comparator, and means connected to the output of said comparator for sequentially and selectively enabling the transmission gates associated with said resistor dividers, digitizing means connected to receive the output of said sector selection circuitry and said determining means.

3. A synchro-digital converter comprising a synchro transmitter, input transmission gates disposed in the stator leads of said transmitter, a phase detector disposed in each of said stator leads, sector selection circuitry in the output of said phase detectors and placed in enabling control of said input transmission gates, means connected to the output of said input transmission gates for determining the ratio between stator voltages selected by said sector selection circuitry, said ratio determining means comprising two parallel channels, with said input transmission gates disposed in the input sides of said channels and a comparator disposed in the output side thereof, one of said channels comprising in series combination a line amplifier, a curve fitting resistor divider, a second set of transmission gates, a linear resistor divider and a third set of transmission gates, the other of said channels comprising a connection between said input transmission gates and said comparator and a line amplifier in said connection, and a clock actuated scanner, a plurality of blocking oscillators, each of said blocking oscillators having an "AND" gate in its input side, said scanner and said comparator being arranged to sequentially fire said blocking oscillators, the second and third sets of transmission gates associated with said dividers being selectively enabled by said blocking oscillators and adapted thereby to sample voltage increments provided by said resistor dividers, a change of state control connection between the output of said comparator and the "AND" gates in the input of said blocking oscillators, means for digitally representing the combined state of said blocking oscillators and adding thereto the output of said sector selection circuitry.

4. A synchro-digital converter comprising a synchro transmitter, input transmission gates disposed in the stator leads of said transmitter, a phase detector disposed in each of said stator leads, sector selection circuitry in the output of said phase detectors and placed in enabling control of said input transmission gates, means connected to the output of said input transmission gates for determining the ratio between stator voltages selected by said sector selection circuitry, said ratio determining means comprising two parallel channels, with said input transmission gates disposed in the input sides of said channels and a comparator disposed in the output side thereof, one of said channels comprising in series combination a line amplifier, a curve fitting resistor divider, a second set of transmission gates, a linear resistor divider and a third set of input transmission gates, the other of said channels comprising a connection between said transmission gates and said comparator and a line amplifier in said connection, and a clock actuated scanner, a plurality of blocking oscillators, each of said blocking oscillators having an "AND" gate in its input side, said scanner and said comparator being arranged to sequentially fire said blocking oscillators, the second and third sets of transmission gates associated with said dividers being selectively enabled by said blocking oscillators and adapted thereby to sample voltage increments provided by said resistor dividers, a change of state control connection between the output of said comparator and the "AND" gates in the input of said blocking oscillators, an integrator, said synchro transmitter having a rotor reference connection, said phase detectors and said integrator being connected to said rotor reference connection, a pretrigger generator disposed between said integrator and the second and third sets of transmission gates in said parallel channels, a zero cross generator connected to the output of said integrator and arranged to supply sampling command pulse to said clock scanner, means for digitally representing the combined state of said blocking oscillators and adding thereto the output of said sector selection circuitry.

References Cited in the file of this patent

UNITED STATES PATENTS 2,966,300 Dickinson ------------- Dec. 27, 1960